US011619556B1

(12) United States Patent
Chen et al.

(10) Patent No.: US 11,619,556 B1
(45) Date of Patent: Apr. 4, 2023

(54) CONSTRUCTION MONITORING METHOD AND SYSTEM FOR V-SHAPED COLUMN IN UNDERGROUND FOUNDATION PIT, TERMINAL AND STORAGE MEDIUM

(71) Applicant: SHENZHEN UNIVERSITY, Guangdong (CN)

(72) Inventors: Xiangsheng Chen, Guangdong (CN); Jun Shen, Guangdong (CN); Xiaohua Bao, Guangdong (CN); Min Zhu, Guangdong (CN); Hongzhi Cui, Guangdong (CN); Yong Zhao, Guangdong (CN); Changqing Xia, Guangdong (CN); Jiqiang Liu, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 17/822,145

(22) Filed: Aug. 25, 2022

(30) Foreign Application Priority Data

Nov. 26, 2021 (CN) .......................... 202111416365.9

(51) Int. Cl.
G01L 1/00 (2006.01)
G01L 1/20 (2006.01)
G06Q 10/0639 (2023.01)
E21C 41/16 (2006.01)

(52) U.S. Cl.
CPC .............. *G01L 1/205* (2013.01); *E21C 41/16* (2013.01); *G06Q 10/06398* (2013.01)

(58) Field of Classification Search
CPC .... G01L 1/205; E21C 41/16; G06Q 10/06398
See application file for complete search history.

(56) References Cited

U.S. PATENT DOCUMENTS

| 5,200,704 | A | * | 4/1993 | Clark, Jr. | ................. G01B 7/14 324/202 |
| 5,241,301 | A | * | 8/1993 | Rivola | .................... C23F 13/04 205/776.5 |
| 5,331,286 | A | * | 7/1994 | Rivola | .................... C23F 13/04 324/718 |
| 5,819,859 | A | * | 10/1998 | Stump | .................... G01S 13/74 175/45 |

(Continued)

FOREIGN PATENT DOCUMENTS

| CN | 107305727 A | 10/2017 |
| CN | 110485429 A | 11/2019 |

OTHER PUBLICATIONS

First Office Action from CN 202111416365.9, dated Jan. 10, 2022.
Notification to Grant Patent Rights for Invention from CN 202111416365.9 .X, dated Jan. 19, 2022.

*Primary Examiner* — Max H Noori
(74) *Attorney, Agent, or Firm* — Mark T. Vogelbacker; Eckert Seamans Cherin & Mellott, LLC

(57) ABSTRACT

A construction monitoring method and system for a V-shaped column in an underground foundation pit, a terminal and a storage medium can include the following steps: acquiring different stress-related data at a plurality of preset positions of stand columns in real time; and analyzing and judging whether the change rate of the stress-related data exceeds a preset change rate range or not or whether the stress-related data exceeds a preset stress-related data range or not.

20 Claims, 9 Drawing Sheets

(56) References Cited

U.S. PATENT DOCUMENTS

| | | | | |
|---|---|---|---|---|
| 8,447,532 | B1* | 5/2013 | Goroshevskiy | G01L 1/125 |
| | | | | 702/42 |
| 8,633,699 | B2* | 1/2014 | Linscott | G01V 3/12 |
| | | | | 324/72 |
| 10,739,479 | B2* | 8/2020 | Liu | G01V 1/303 |
| 2006/0060011 | A1* | 3/2006 | Jensen | F04B 47/022 |
| | | | | 74/41 |
| 2012/0173216 | A1* | 7/2012 | Koepsell | E21B 49/00 |
| | | | | 703/6 |
| 2017/0350864 | A1* | 12/2017 | Goroshevskiy | B64C 39/024 |
| 2018/0113049 | A1* | 4/2018 | Chung | G01M 5/0033 |
| 2019/0324444 | A1* | 10/2019 | Celia | G05B 23/0229 |

\* cited by examiner

CONSTRUCTION MONITORING METHOD AND SYSTEM FOR V-SHAPED COLUMN IN UNDERGROUND FOUNDATION PIT, TERMINAL AND STORAGE MEDIUM

CROSS REFERENCE TO RELATED APPLICATION

This patent application claims the benefit and priority of Chinese Patent Application No. 202111416365.9, filed on Nov. 26, 2021, the disclosure of which is incorporated by reference herein in its entirety as part of the present application.

TECHNICAL FIELD

The present disclosure relates to the field of engineering construction safety monitoring, in particular to a construction monitoring method and system for a V-shaped column in an underground foundation pit, a terminal and a storage medium.

BACKGROUND ART

At present, a V-shaped column construction scheme is adopted when many underground structures are constructed.

When an existing underground structure is constructed, a main body structure 1 is firstly supported by stand columns 3, and then a V-shaped column 2 is constructed. After the V-shaped column 2 is constructed, the original stand columns 3 need to be disassembled, and the V-shaped column 2 is singly used for supporting. Therefore, in the process of constructing the V-shaped column 2 and before the disassembling and supporting construction, workers need to know the stress data condition of the original stand columns 3, and consequently, whether the construction of the V-shaped column 2 is problematic or not is indirectly analyzed and preparation is made for subsequent disassembling and supporting construction. The stress data of the stand columns 3 comprises the settlement data and inclination angle change data of the stand columns 3 and the stress data of the stand columns 3, and the data is detected and acquired mainly by installing corresponding detection devices at fixed point positions of the stand columns 3, referring to FIG. 1.

In the prior art, after related detection data is detected by the corresponding detection devices, the related detection data is uploaded to a data management platform regularly, and then the data management platform can form a related chart in combination with historical conditions of the related detection data. Subsequent related responsible workers can log in the data management platform to check and know the overall stress-related data of the stand columns when needed, so that whether the construction of the V-shaped columns 2 is problematic or not is indirectly analyzed, and preparation is made for subsequent disassembling and supporting construction.

Aiming at the above related technologies, the inventor considers that the following defects exist: at present, related stress data is uploaded to the data management platform regularly, and if the uploaded stress data change greatly or exceed a preset value, the stress data is uploaded according to a normal timing period, and then related responsible workers can delay to find problems existing during the construction of the V-shaped column at present, so that the problems existing during the construction of the V-shaped column at present cannot be handled in time.

SUMMARY

In order to shorten the timing opportunity for uploading stress data to a data management platform in time when the stress data is problematic so as to improve the probability that workers find out problems during the construction of a V-shaped column, the present disclosure provides a construction monitoring method and system for a V-shaped column in an underground foundation pit, a terminal and a storage medium.

On the first aspect, the present disclosure provides a construction monitoring method for a V-shaped column in an underground foundation pit. The following technical scheme is adopted.

A construction monitoring method for a V-shaped column in an underground foundation pit comprises the following steps:

regularly acquiring stress data at a plurality of preset positions of stand columns;

analyzing and judging whether the change rate of the stress data exceeds a preset change rate or the stress data exceeds preset stress data;

if yes, shortening the time limit for acquiring the stress data according to a preset proportion to form a new timing time limit, and uploading the stress data to a data management platform according to the new timing time limit on time; and if no, uploading the acquired stress data to the data management platform according to original timing time limit on time.

By adopting the technical scheme, the supporting stress condition of the stand columns can be known regularly through the stress data uploaded to the data management platform. Moreover, when the stress data is problematic, the original time limit for uploading the stress data can be effectively shortened, so that responsible workers can timely and effectively find out the problems during the construction of the V-shaped column.

Optionally, the construction monitoring method for a V-shaped column in an underground foundation pit further comprises the step parallel to the step of uploading the stress data to the data management platform according to the new timing time limit on time, specifically comprising the following steps:

acquiring specific reason information for forming the new timing time limit;

analyzing and determining root problem information formed by current specific reasons and root problem probability distribution information based on the corresponding relation between the specific reason information and the root problem information formed by the corresponding specific reasons and root problem probability distribution information;

analyzing and confirming responsible workers with the highest overall success rate data as notified responsible workers based on the root problem information formed by current specific reasons and root problem probability distribution information, and the success rate data about information processing of different root problems of the responsible workers, and defining at least two responsible workers; and sending notification information for notifying the analyzed and confirmed responsible workers to the construction site of the V-shaped column for processing to terminals held by corresponding responsible workers.

By adopting the technical scheme, the reason for forming the new timing time limit caused by analysis is further considered, and the responsible workers with the highest overall success rate data can be effectively analyzed and notified based on the probability distribution condition of the corresponding reasons and the processing success rate data of the responsible workers. Therefore, the processing success rate of the root problems is indirectly improved.

Optionally, the step of analyzing and confirming responsible workers with the highest overall success rate data as notified responsible workers comprises the following steps:

multiplying the probability of the root problem information formed by current specific reasons one by one by the success rate of the responsible workers about information processing of corresponding root problems so as to acquire probabilities that the responsible workers encounter different root problems and successfully process the root problems; and taking the sum of the probabilities that the responsible workers encounter different root problems and successfully process the root problems as the overall success rate that the responsible workers encounter the root problems and successfully process the root problems, and taking the responsible workers with the highest overall success rate data as the notified responsible workers.

By adopting the technical scheme, the present disclosure specifically discloses how to effectively analyze and calculate the overall success rate of the responsible workers for encountering the root problems and processing the root problems in combination with the probability of the root problem information formed by the current specific reasons and the success rate of the responsible workers about information processing of corresponding root problems. Therefore, a foundation is laid for successful processing of subsequent root problems.

Optionally, the step of sending notification information for notifying the analyzed and confirmed responsible workers to the construction site of the V-shaped column for processing to terminals held by corresponding responsible workers comprises the following steps:

acquiring the contact information of the analyzed and confirmed responsible workers;

sending the notification information to the terminals held by corresponding responsible workers;

if the notification information is not confirmed to be received within the preset time, inquiring and acquiring the current working state information of the responsible workers, and comprehensively analyzing and determining average feedback duration data of the responsible workers after receiving the notification information under the current working state information in combination with the average feedback duration data of the responsible workers after receiving the notification information under different working state information;

sending the notification information to the terminals held by corresponding responsible workers again, and starting timing when the sending is successful;

if the responsible workers confirm receiving within the average feedback duration data after receiving the notification information, confirming that the corresponding responsible workers are successfully notified;

otherwise, screening out the responsible workers with the highest overall success rate data from the other responsible workers as the notified responsible workers, and sending the notification information to the corresponding responsible workers; and if the notification information is confirmed to be received within the preset time, confirming that the corresponding responsible workers are successfully notified.

By adopting the technical scheme, the responsible workers are directly notified after the responsible workers needing to be notified are confirmed. Under the condition that the first notification is not successful, the average feedback duration data after the responsible workers receive the notification information under the current working state information is analyzed and determined, and notification is carried out again. When the condition that the responsible workers do not make feedback within the average feedback duration occurs, the most appropriate responsible workers can be screened out from the remaining responsible workers for notification, so that the appropriate responsible workers can be effectively and timely notified, and timely processing of the root problems can be indirectly guaranteed.

Optionally, the step of sending notification information for notifying the analyzed and confirmed responsible workers to the construction site of the V-shaped column for processing to terminals held by corresponding responsible workers comprises the following steps:

acquiring the analyzed and confirmed contact information of the responsible workers, the working states of the responsible workers in different working periods and the average feedback duration data of the responsible workers after receiving the notification information under different working state information;

acquiring the average feedback duration data of the responsible workers in the working state of the current time period;

acquiring the time consumed by the responsible workers from the current time node to the next working period, and taking the sum of the consumed time and the average feedback duration data of the responsible workers in the working state of the next working period as the real average feedback duration data notified by the responsible workers in the next working period;

comparing the average feedback duration data of the responsible workers in the working state of the current time period with the real average feedback duration data notified by the responsible workers in the next working period;

if the average feedback duration data of the responsible workers in the working state of the current time period is small, sending the notification information to the terminals held by the responsible workers at the current time; and if the real average feedback duration data notified by the responsible workers in the next working period is small, sending the notification information to the terminals held by the responsible workers at the time nodes at which the responsible workers start in the next working period.

By adopting the technical scheme, the fact that the feedback durations of the responsible workers in different working states are different is further considered. Therefore, the most appropriate notification opportunity is determined by comprehensively analyzing and comparing the time consumed by the responsible workers to make feedback after immediately notifying the responsible workers at present and the total time consumed by the responsible workers to make feedback after notifying the responsible workers in the next working state of the responsible workers, so that the processing timeliness of the root problems is indirectly improved.

Optionally, the construction monitoring method for a V-shaped column in an underground foundation pit further comprises the step of sending notification information for notifying the analyzed and confirmed responsible workers to the construction site of the V-shaped column for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

By adopting the technical scheme, it is further considered that the root problems analyzed and judged by the responsible workers on site are different and may be problems of the detection devices, or the stress data may be problematic. Particularly once the problems are judged to be problems of the detection devices, whether the detection data before the detection devices are problematic or not needs to be traced. At the moment, the time nodes at which the detection devices are problematic and the data change track information of the detection devices and the corresponding detection devices after different specific fault problems occur can be traced, so that the real stress data which should be uploaded at the time nodes with the data transmission problem is comprehensively analyzed.

On the second aspect, the present disclosure provides a construction monitoring system for a V-shaped column in an underground foundation pit. The following technical scheme is adopted.

A construction monitoring system for a V-shaped column in an underground foundation pit comprises a memory, a processor and a program stored on the memory and capable of running on the processor, wherein the program can be loaded and executed by the processor to realize the construction monitoring method for a V-shaped column in an underground foundation pit as mentioned on the first aspect.

By adopting the technical scheme, the supporting stress condition of the stand columns can be known regularly through the stress data uploaded to the data management platform by acquiring related program. Moreover, when the stress data is problematic, the original timing time limit for uploading the stress data can be effectively shortened, so that responsible workers can timely and effectively find out the problems during the construction of the V-shaped column.

On the third aspect, the present disclosure provides a computer storage medium. The following technical scheme is adopted.

The computer storage medium comprises a program capable of being loaded and executed by the processor to realize the construction monitoring method for a V-shaped column in an underground foundation pit as mentioned on the first aspect.

By adopting the technical scheme, the supporting stress condition of the stand columns can be known regularly through the stress data uploaded to the data management platform by acquiring related program. Moreover, when the stress data is problematic, the original timing time limit for uploading the stress data can be effectively shortened, so that responsible workers can timely and effectively find out the problems during the construction of the V-shaped column.

On the fourth aspect, the present disclosure provides a terminal. The following technical scheme is adopted.

The terminal comprises a memory, a processor and a program stored on the memory and capable of running on the processor, wherein the program can be loaded and executed by the processor to realize the construction monitoring method for a V-shaped column in an underground foundation pit as mentioned on the first aspect.

By adopting the technical scheme, the supporting stress condition of the stand columns can be known regularly through the stress data uploaded to the data management platform by acquiring related program. Moreover, when the stress data is problematic, the original timing time limit for uploading the stress data can be effectively shortened, so that responsible workers can timely and effectively find out the problems during the construction of the V-shaped column.

In summary, the present disclosure has the following beneficial technical effects.

Firstly, whether to adjust the stress data condition to be uploaded to the data management platform can be determined based on whether the stress data condition meets the preset conditions, so that the responsible workers can pay attention to the problematic stress data condition in time.

Secondly, when the stress data condition is problematic, the responsible workers with the highest processing success rate can be screened out in time for notification, and the real-time reply condition of the responsible workers can be comprehensively considered during notification to determine a notification strategy, so that the responsible workers most suitable for processing can be notified.

Thirdly, whether to adjust the stress data uploaded to the data management platform before can be determined based on the feedback of the root problems processed by the responsible workers on site, so that the change condition of the stress data can be reflected more truly and accurately.

Reference signs: 1, main structure; 2, V-shaped column; 3, stand column; 4, hydrostatic level instrument; 5, inclinometer; and 6, reinforcement meter.

DETAILED DESCRIPTION OF THE EMBODIMENTS

The following describes the present disclosure in detail with reference to the attached figures.

Figure 1:
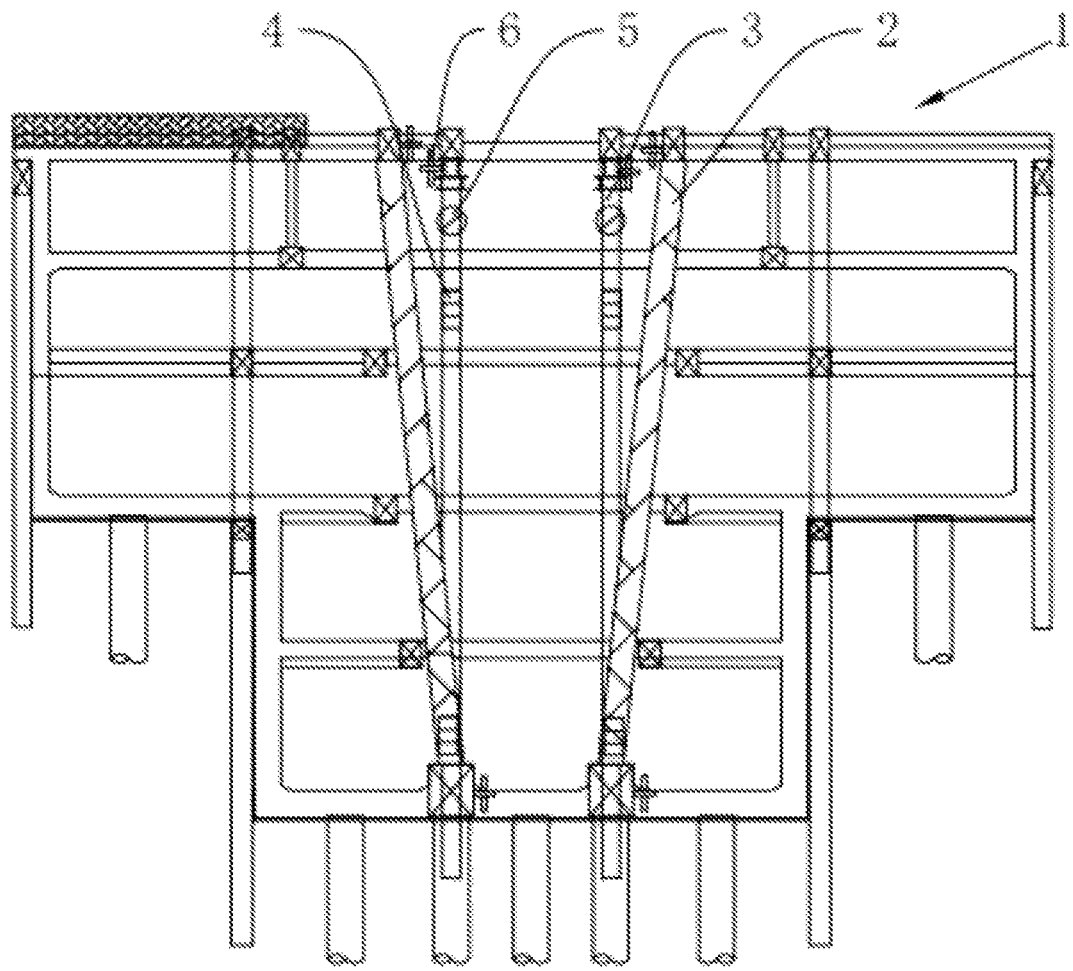
FIG. 1 is a structural schematic diagram of an construction monitoring method for a V-shaped column in an underground foundation pit in the embodiment of the present disclosure.

With reference to FIG. 1, when an existing underground structure is constructed, a main body structure 1 is firstly supported by stand columns 3, and then a V-shaped column 2 is built. After the V-shaped column 2 is built, the original stand columns 3 need to be dismounted, and the V-shaped column 2 is singly used for supporting. At the moment, the stress data conditions of the stand columns 3 need to be monitored in real time. The stress data of the stand columns 3 comprises settlement data, inclination angle change data and stress data of the stand columns 3.

Specifically, measuring points for settlement monitoring of the stand columns 3 are arranged on the side walls of the stand columns 3, and the settlement data can be measured and acquired through the hydrostatic level instrument 4. Inclination monitoring of the stand columns 3 is that the inclination angle change data is measured and acquired through inclinometers 5 arranged on each stand column 3. The stress data of the stand columns 3 is detected through reinforcement meter 6 uniformly arranged on the peripheries of the stand columns 3, and the stress data of the stand columns 3 is acquired.

It should be noted that the hydrostatic level instrument 4 is a precise instrument for measuring the altitude difference and the change of the altitude difference. The device is mainly used for monitoring vertical displacement and inclination of pipe galleries, dams, nuclear power stations, high-rise buildings, foundation pits, tunnels, bridges, subways and the like, and a YT-880B hydraulic type hydrostatic level instrument can be selected. As a high-precision liquid level measuring instrument, the hydrostatic level instrument is used for measuring relative settlement of a foundation and each measuring point of a building, and is applied to measurement of uneven settlement of measuring points in construction sites including large buildings such as hydropower stations, dams, high-rise buildings, nuclear power stations, water-control projects, railways, subways, high-speed rails and the like.

The inclinometer 5 is also known as a goniometer or an electronic goniometer, and is commonly used for measuring horizontal angles, relative angles and inclination angles. In the present disclosure, the working principle of the inclinometer 5 is as follows: when a shaft in a cylinder rotates in one direction, the reading is increased, and when the rotation direction is changed, the count is decreased. The count is related to the initial position of the inclinometer, and the count value is set to be zero when the inclinometer is initialized. By calculating the rotation angle, the position and the speed can be measured. A YT-600A triaxial fixed inclinometer can be selected, the inclinometer is a high-precision, low-power-consumption and triaxial inclination angle sensor, an NB-IOT wireless communication mode is adopted, GPS/Beidou positioning is achieved, a built-in battery or solar energy can be selected for power supply, and the device is suitable for horizontal and surface inclination angle and displacement measurement of hydraulic structures such as concrete dams, concrete faced rockfill dams and earth and rockfill dams and rock masses such as slopes, and is also suitable for measurement of foundation deformation or inclination angle and displacement changes of building structures, roads, bridges, tunnels, foundation pits and the like.

The reinforcement meter 6 is a vibrating wire type sensor which is used for being buried in a hydraulic structure or other concrete structures for a long time, measuring reinforcement stress in the structures and synchronously measuring the temperature of buried points.

Figure 2:
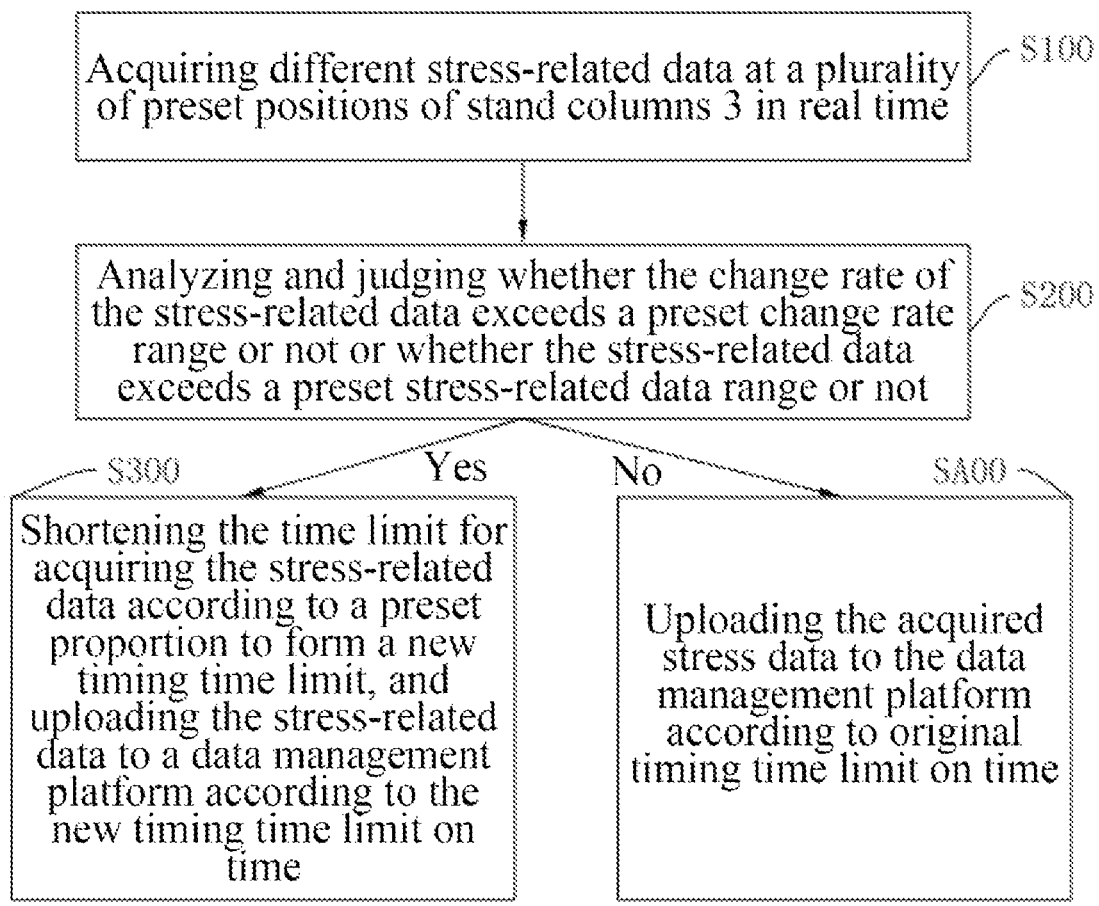
FIG. 2 is a schematic diagram of overall steps of an construction monitoring method for a V-shaped column in an underground foundation pit in the embodiment of the present disclosure.

Referring to FIG. 2, a construction monitoring method for a V-shaped column in an underground foundation pit comprises the following steps.

Step S100, acquiring different stress-related data at a plurality of preset positions of stand columns 3 in real time.

Step S200, analyzing and judging whether the change rate of the stress-related data exceeds a preset change rate range or not or whether the stress-related data exceeds a preset stress-related data range or not. If yes, carrying out step S300; and if no, carrying out step SA00.

Wherein, the analysis and judgment whether the change rate of the stress-related data exceeds the preset change rate range or not is to analyze whether the change rate of the stress-related data falls within the preset change rate range or not. Similarly, the analysis and judgment that the stress-related data exceeds the preset stress-related data range is to analyze whether the change rate of the stress-related data falls within the preset stress-related data range.

For example, assuming that the change rate of the stress-related data is 5% and the preset change rate range is [−2, 2], the stress-related data exceeds the preset change rate range. Similarly, assuming that the stress-related data is inclination angle data, the existing value of the inclination angle is 30°, and the preset inclination angle range is [29°, 31°], the inclination angle data is within the range.

Step S300, shortening the time limit for acquiring the stress-related data according to a preset proportion to form a new timing time limit, and uploading the stress-related data to a data management platform according to the new timing time limit on time.

Figure 3:
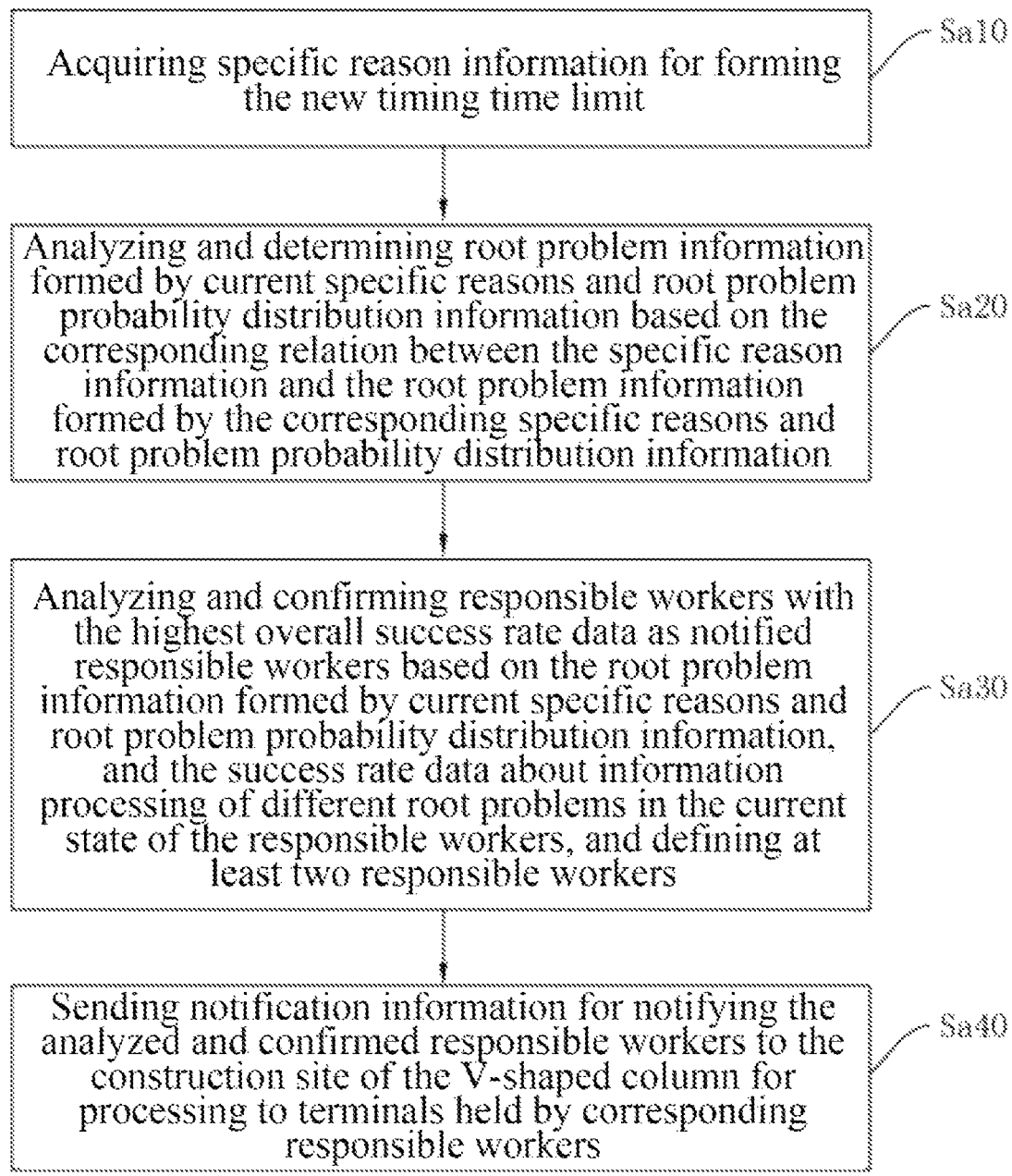
FIG. 3 is a schematic diagram of specific steps, parallel to step S300, in the embodiment of the present disclosure.

Referring to FIG. 3, wherein the construction monitoring method for a V-shaped column in an underground foundation pit further comprises the step parallel to the step of uploading the stress data to the data management platform according to the new timing time limit on time, specifically comprising the following steps.

Step Sa10, acquiring specific reason information for forming the new timing time limit.

Wherein, the specific reason information for forming the new timing time limit can be acquired by tracing and inquiring the previous step.

It should be noted that the specific reason information for forming the new timing time limit comprises that the change rate of the stress-related data exceeds the preset change rate range and the stress-related data exceeds the preset stress-related data range.

Step Sa20, analyzing and determining root problem information formed by current specific reasons and root problem probability distribution information based on the corresponding relation between the specific reason information and the root problem information formed by the corresponding specific reasons and root problem probability distribution information.

Wherein, the corresponding relation between the specific reason information and the root problem information formed by the corresponding specific reasons and root problem probability distribution information is stored in related databases. The analysis and confirmation of the root problem information formed by the current specific reasons and the root problem probability distribution information can be acquired by inquiring the corresponding databases.

In addition, the above-mentioned root problems are roots really causing the corresponding reasons. For example, when the inclination angle data of the stand columns 3 is problematic, the root problems may be the fault of a device for detecting the inclination angle, or may be a real problem of the actual inclination angle data, or may be a short problem affected by external environment.

Step Sa30, analyzing and confirming responsible workers with the highest overall success rate data as notified responsible workers based on the root problem information formed by current specific reasons and root problem probability distribution information, and the success rate data about information processing of different root problems in the current state of the responsible workers, and defining at least two responsible workers.

Figure 4:
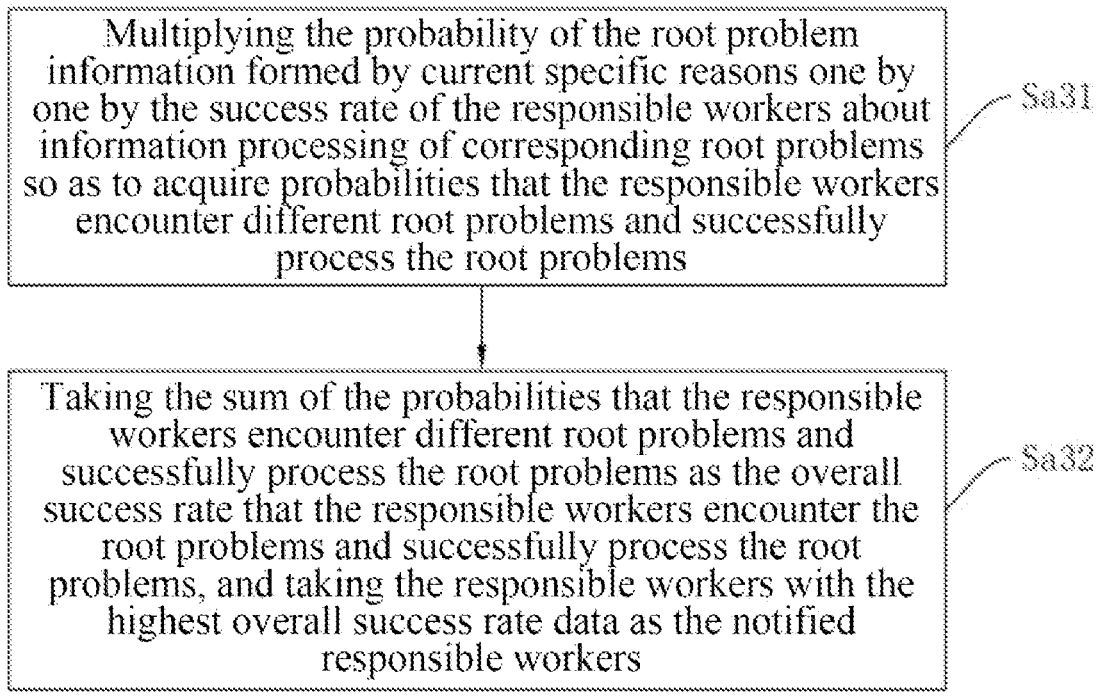
FIG. 4 is a schematic diagram of specific steps in step Sa30 in FIG. 3.

Referring to FIG. 4, wherein, the step of analyzing and confirming responsible workers with the highest overall success rate data as notified responsible workers as mentioned in step Sa30 comprises step Sa31 to step Sa32.

In the step Sa31, multiplying the probability of the root problem information formed by current specific reasons one by one by the success rate of the responsible workers about information processing of corresponding root problems so as to acquire probabilities that the responsible workers encounter different root problems and successfully process the root problems.

In the step Sa32, taking the sum of the probabilities that the responsible workers encounter different root problems and successfully process the root problems as the overall success rate that the responsible workers encounter the root problems and successfully process the root problems, and taking the responsible workers with the highest overall success rate data as the notified responsible workers.

For example, it is assumed that the number of the root problems, including problem A, problem B and problem C sequentially, formed by the current specific reasons is three, the probability of the problem A is 30%, the probability of the problem B is 40%, the probability of the problem C is 30%, and the number of the responsible workers, including worker A and worker B respectively, is two.

The probability that the worker A solves the problem A is 80%, the probability that the worker A solves the problem B is 90%, and the probability that the worker A solves the problem C is 95%. The probability that the worker B solves the problem A is 90%, the probability that the worker B solves the problem B is 80%, and the probability that the worker B solves the problem C is 90%.

The probability that the worker A encounters different root problems and successfully processes the root problems is 0.88, the probability that the worker B encounters different root problems and successfully processes the root problems is 0.86, and at the moment, the worker A is selected as a notified responsible worker.

Figure 5:
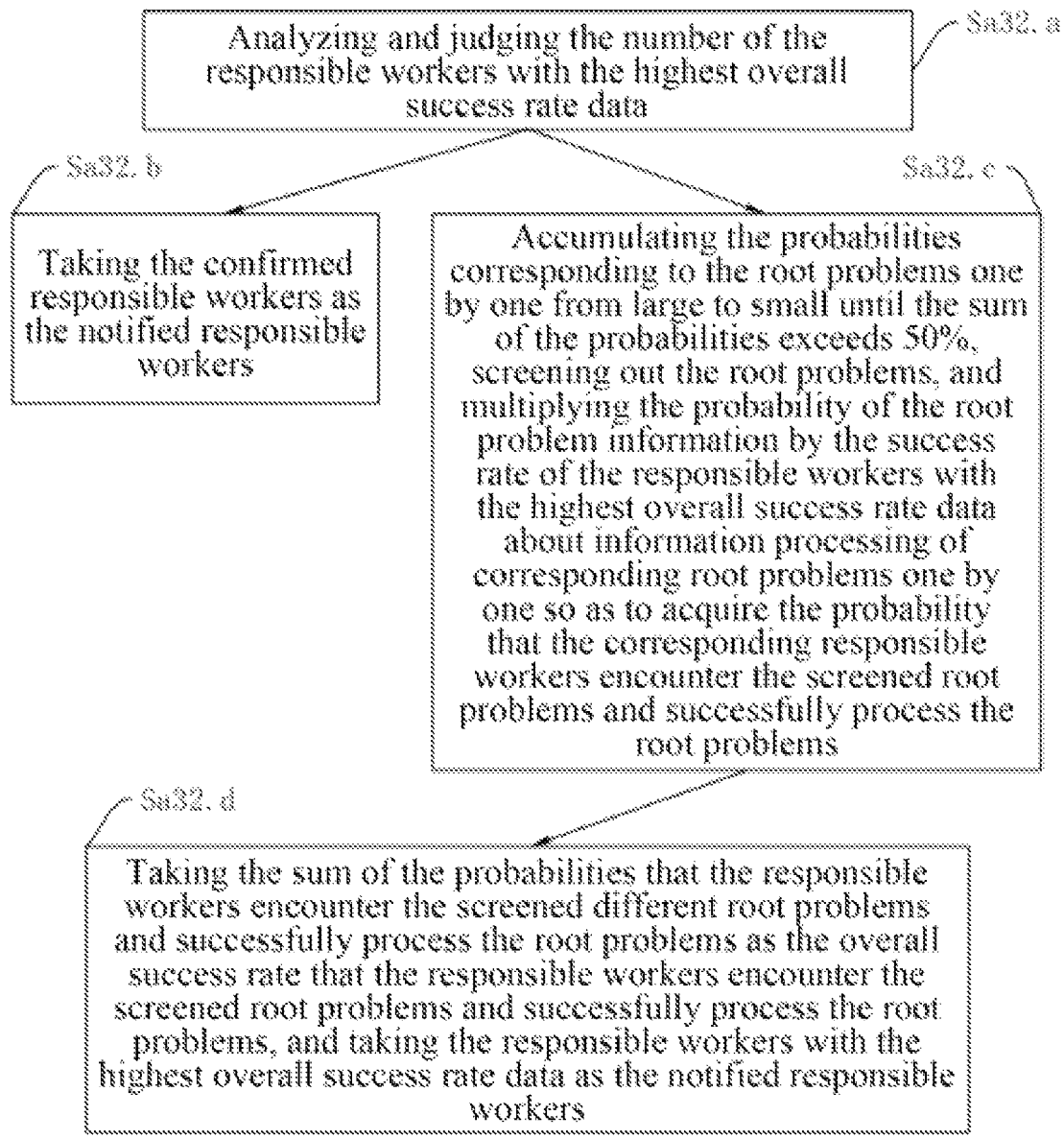
FIG. 5 is a schematic diagram of specific steps of taking the responsible workers with the highest overall success rate data as the notified responsible workers as mentioned in step Sa32 in FIG. 4.

Referring to FIG. 5, wherein, the step of taking the responsible workers with the highest overall success rate data as the notified responsible workers as mentioned in step Sa32 comprises the following steps.

Step Sa32.*a*, analyzing and judging the number of the responsible workers with the highest overall success rate data. If the number is one, carrying out step Sa32.*b*; and if the number exceeds one, carrying out step Sa32.*c*.

Step Sa32.*b*, taking the confirmed responsible workers as the notified responsible workers.

Step Sa32.*c*, accumulating the probabilities corresponding to the root problems one by one from large to small until the sum of the probabilities exceeds 50%, screening out the root problems, and multiplying the probability of the root problem information by the success rate of the responsible workers with the highest overall success rate data about information processing of corresponding root problems one by one so as to acquire the probability that the corresponding responsible workers encounter the screened root problems and successfully process the root problems.

Step Sa32.*d*, taking the sum of the probabilities that the responsible workers encounter the screened different root problems and successfully process the root problems as the overall success rate that the responsible workers encounter the screened root problems and successfully process the root problems, and taking the responsible workers with the highest overall success rate data as the notified responsible workers.

For example, assuming that the overall processing success rates of the worker A and the worker B are the same, the number of the problems, including problem A, problem B and problem C, is three, the probability of the problem A is 20%, the probability of the problem B is 40%, and the probability of the problem C is 40%. Since the sum of the probabilities of the two root problems B and C exceeds 50%, the problems B and C are selected as the selected source problems. The probability of specific processing success is similar to the calculation of the overall success rate, and details are not described herein again.

Step Sa40, sending notification information for notifying the analyzed and confirmed responsible workers to the construction site of the V-shaped column 2 for processing to terminals held by corresponding responsible workers.

Firstly, it should be noted that the terminal held by the corresponding responsible workers as mentioned in the step Sa40 may be a mobile phone, a computer or other communicable terminal equipment, and the subsequent description is not repeated.

Figure 6:
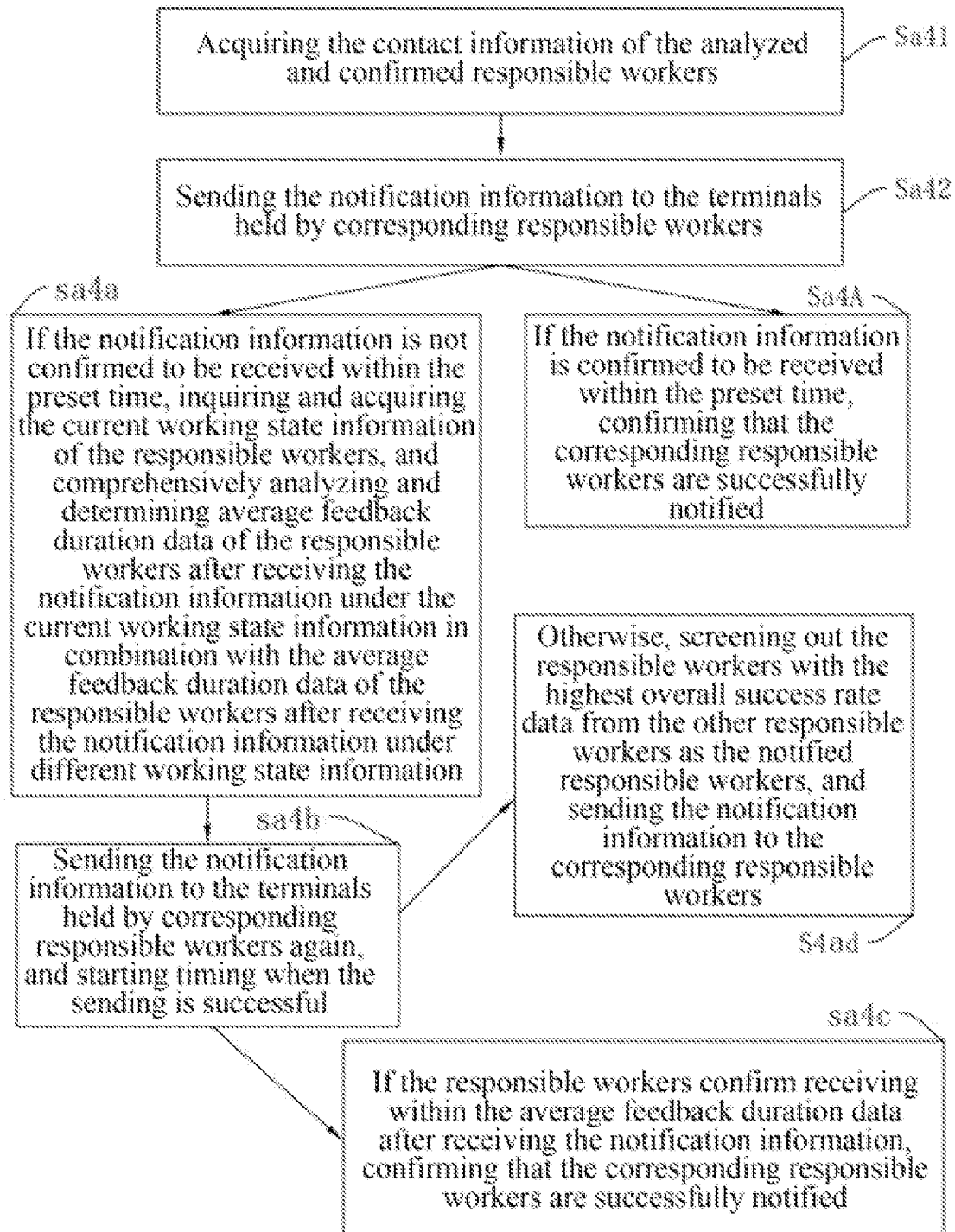
FIG. 6 is a schematic diagram of specific steps of sending notification information for notifying the analyzed and confirmed responsible workers to the construction site of the V-shaped column for processing to terminals held by corresponding responsible workers in an implementation method as mentioned in step Sa40 in FIG. 3.

Referring to FIG. 6, as one of implementation methods in the step Sa40, the step Sa40 comprises the following steps.

Step Sa41, acquiring the contact information of the analyzed and confirmed responsible workers.

Wherein, the contact information of the analyzed and confirmed responsible workers can be acquired by inquiring the related databases.

Step Sa42, sending the notification information to the terminals held by corresponding responsible workers.

Step Sa4*a*, if the notification information is not confirmed to be received within the preset time, inquiring and acquiring the current working state information of the responsible workers, and comprehensively analyzing and determining average feedback duration data of the responsible workers after receiving the notification information under the current working state information in combination with the average feedback duration data of the responsible workers after receiving the notification information under different working state information.

Wherein, the preset time indicated when the notification information as mentioned in the step Sa4a is not confirmed to be received within the preset time can be 1 minute or half minute. According to the time set by other responsible workers, the current working state information of the responsible workers can be inquired and acquired by inquiring a time schedule in which the working states of the corresponding responsible workers are stored. The average feedback duration data of the responsible workers after receiving the notification information under different working state information can be acquired by inquiring the databases in which the working states of the responsible workers and the average feedback duration data of the responsible workers after receiving the notification information under the corresponding working states are stored.

Step Sa4b, sending the notification information to the terminals held by corresponding responsible workers again, and starting timing when the sending is successful.

Assuming that the sending time is thirteen fifty-five, the successful sending time is fourteen o'clock, so that the timing is started from fourteen o'clock.

Step Sa4c, if the responsible workers confirm receiving within the average feedback duration data after receiving the notification information, confirming that the corresponding responsible workers are successfully notified.

Assuming that the average feedback duration data is 1 minute, if the responsible workers receive the information within fourteen one, it is confirmed that the corresponding responsible workers are successfully notified.

Step Sa4d, otherwise, screening out the responsible workers with the highest overall success rate data from the other responsible workers as the notified responsible workers, and sending the notification information to the corresponding responsible workers.

Assuming that two responsible workers still exist, the worker with the highest overall success rate data is selected to be notified.

Step Sa4A, if the notification information is confirmed to be received within the preset time, confirming that the corresponding responsible workers are successfully notified.

It should be noted that the preset time in the confirmed reception within the preset time as mentioned in the step Sa4A may be the average information feedback duration data of the current working states of the corresponding responsible workers, or may be the fixed time set by the related workers.

Figure 7:
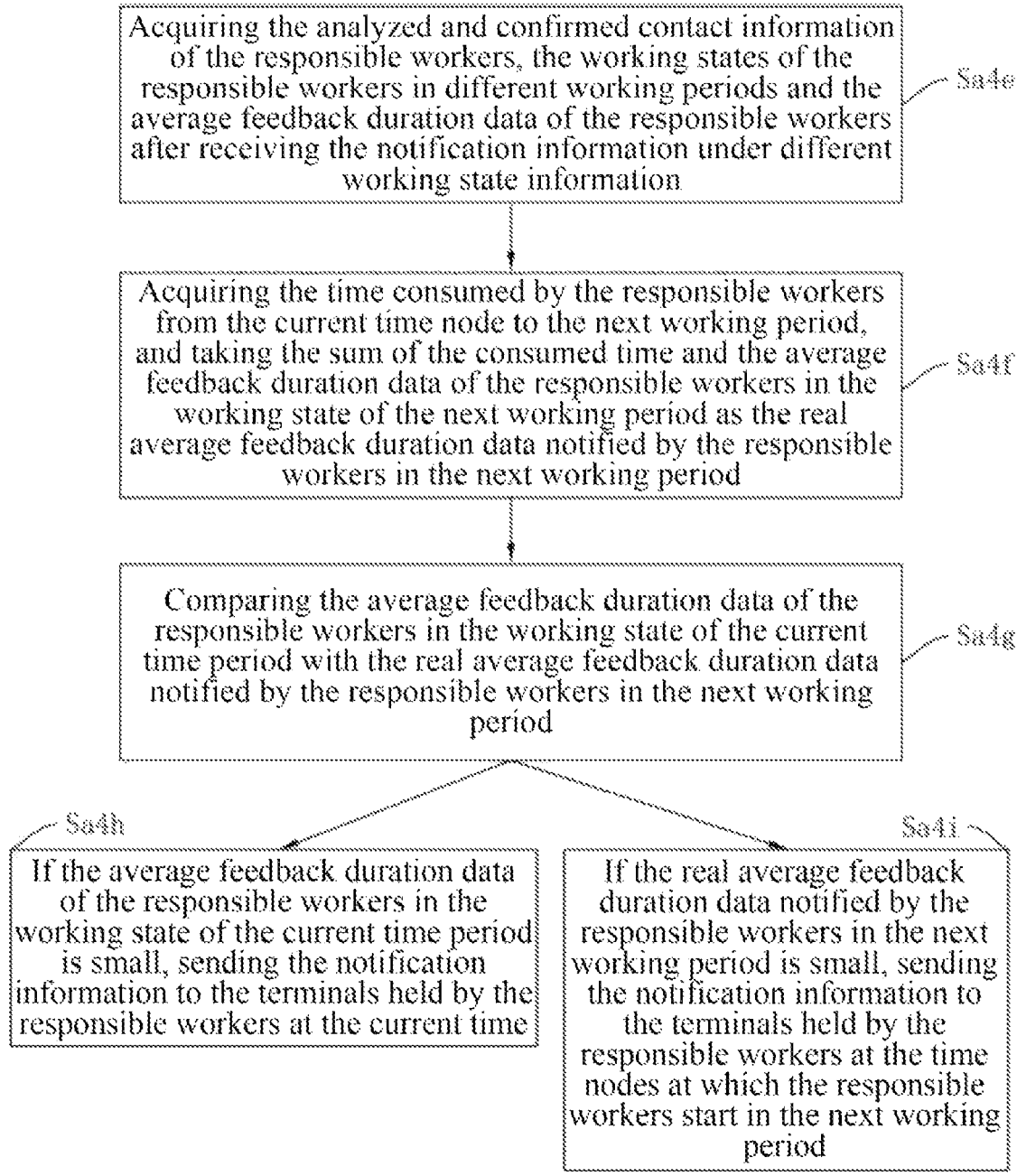
FIG. 7 is a schematic diagram of specific steps of sending notification information for notifying the analyzed and confirmed responsible workers to the construction site of the V-shaped column for processing to terminals held by corresponding responsible workers in another implementation method as mentioned in step Sa40 in FIG. 3.

Referring to FIG. 7, as another implementation method in the step Sa40, the step Sa40 comprises the following steps.

Step Sa4e, acquiring the analyzed and confirmed contact information of the responsible workers, the working states of the responsible workers in different working periods and the average feedback duration data of the responsible workers after receiving the notification information under different working state information.

Wherein, the analyzed and confirmed contact information of the responsible workers can be acquired by inquiring the databases in which the contact information of the responsible workers is stored, and the working states of the responsible workers in different working periods and the average feedback duration data of the responsible workers after receiving the notification information under different working state information can be acquired by inquiring the related databases.

Step Sa4f, acquiring the time consumed by the responsible workers from the current time node to the next working period, and taking the sum of the consumed time and the average feedback duration data of the responsible workers in the working state of the next working period as the real average feedback duration data notified by the responsible workers in the next working period.

For example, assuming that the time consumed by the responsible worker A from the current time node to the next working period is 40 seconds, and the average feedback duration data of the responsible workers in the working state of the next working period is 30 seconds, and the real average feedback duration data notified by the responsible workers in the next working period is 70 seconds.

Step Sa4g, comparing the average feedback duration data of the responsible workers in the working state of the current time period with the real average feedback duration data notified by the responsible workers in the next working period.

Step Sa4h, if the average feedback duration data of the responsible workers in the working state of the current time period is small, sending the notification information to the terminals held by the responsible workers at the current time.

Step Sa4i, if the real average feedback duration data notified by the responsible workers in the next working period is small, sending the notification information to the terminals held by the responsible workers at the time nodes at which the responsible workers start in the next working period.

Assuming that the average feedback duration data of the responsible workers in the working state of the current time period is 2 minutes, the real average feedback duration data notified by the responsible workers in the next working period is 70 seconds.

Figure 8:
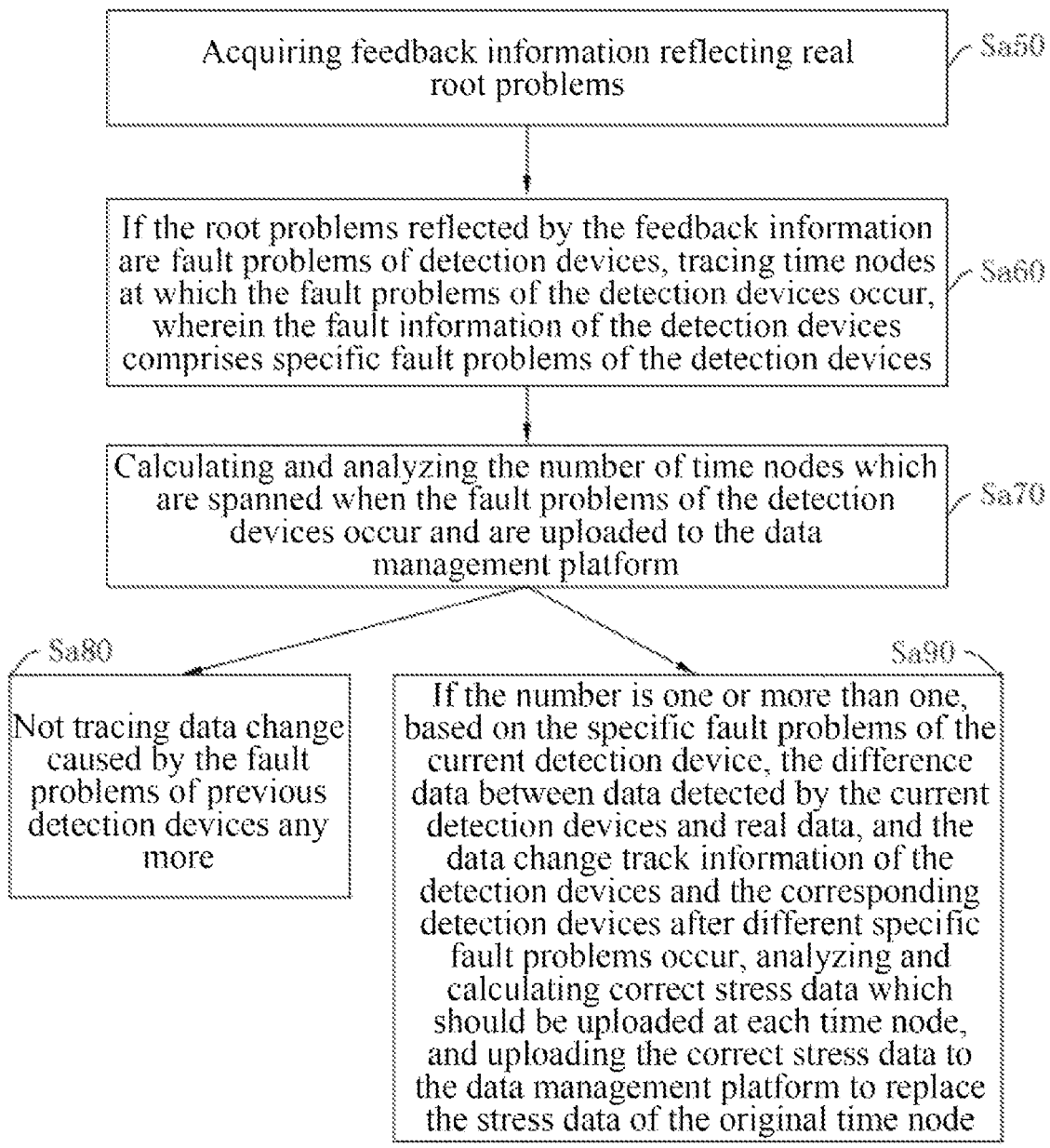
FIG. 8 is a schematic diagram of specific steps after sending notification information for notifying the analyzed and confirmed responsible workers to the construction site of the V-shaped column for processing to terminals held by corresponding responsible workers in the embodiment of the present disclosure.

Referring to FIG. 8, it is further considered that if the root problems are the faults of the detection devices, previously transmitted data is wrong. Based on the above considerations, the construction monitoring method for a V-shaped column in an underground foundation pit further comprises the steps after sending notification information for notifying the analyzed and confirmed responsible workers to the construction site of the V-shaped column 2 for processing to terminals held by corresponding responsible workers, wherein the steps specifically comprise:

Step Sa50, acquiring feedback information reflecting real root problems.

It should be noted that the acquired feedback information reflecting real root problems can be information fed back after site processing of the responsible workers.

Step Sa60, if the root problems reflected by the feedback information are fault problems of detection devices, tracing time nodes at which the fault problems of the detection devices occur, wherein the fault information of the detection devices comprises specific fault problems of the detection devices.

Wherein, the tracing of the time nodes at which the fault problems of the detection devices occur as mentioned in the step Sa60 may be signal-based fault diagnosis.

Specifically, the signal-based fault diagnosis avoids the difficulty in extracting an object mathematical model from different angles, and has the advantage that signal models such as correlation functions and frequency spectrums can be directly utilized to analyze detection signals so as to determine the occurrence of sensor faults. Wherein, the wavelet analysis method is used for sensor fault diagnosis, the sequence change of non-stationary time is analyzed and predicted, the local characteristics of signals at any position can be observed, and the fault occurrence time can be accurately positioned. The fault diagnosis method is especially suitable for extracting mutant components in slowly varying signals. In addition, the partial least square method is also commonly used in the field of sensor fault diagnosis, and has great advantages in processing a multi-input-output system and a serious modeling problem related to data. The fault diagnosis method follows an ideological guidance, that is, principal elements of independent variables and strain variables of the model are solved at the same time, and related data information of the independent variables is fully utilized to explain the strain variables.

Step Sa70, calculating and analyzing the number of time nodes which are spanned when the fault problems of the detection devices occur and are uploaded to the data management platform. If the number is zero, carrying out step Sa80; and if the number is one or more, carrying out step Sa90.

Step Sa80, not tracing data change caused by the fault problems of previous detection devices anymore.

Step Sa90, if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node.

Wherein, the data change track information of the detection devices and the corresponding detection devices after different specific fault problems occur as mentioned in step Sa90 is mainly acquired by inquiring the databases in which the data change track information of the detection devices and the corresponding detection devices after different specific fault problems occur are stored.

Figure 9:
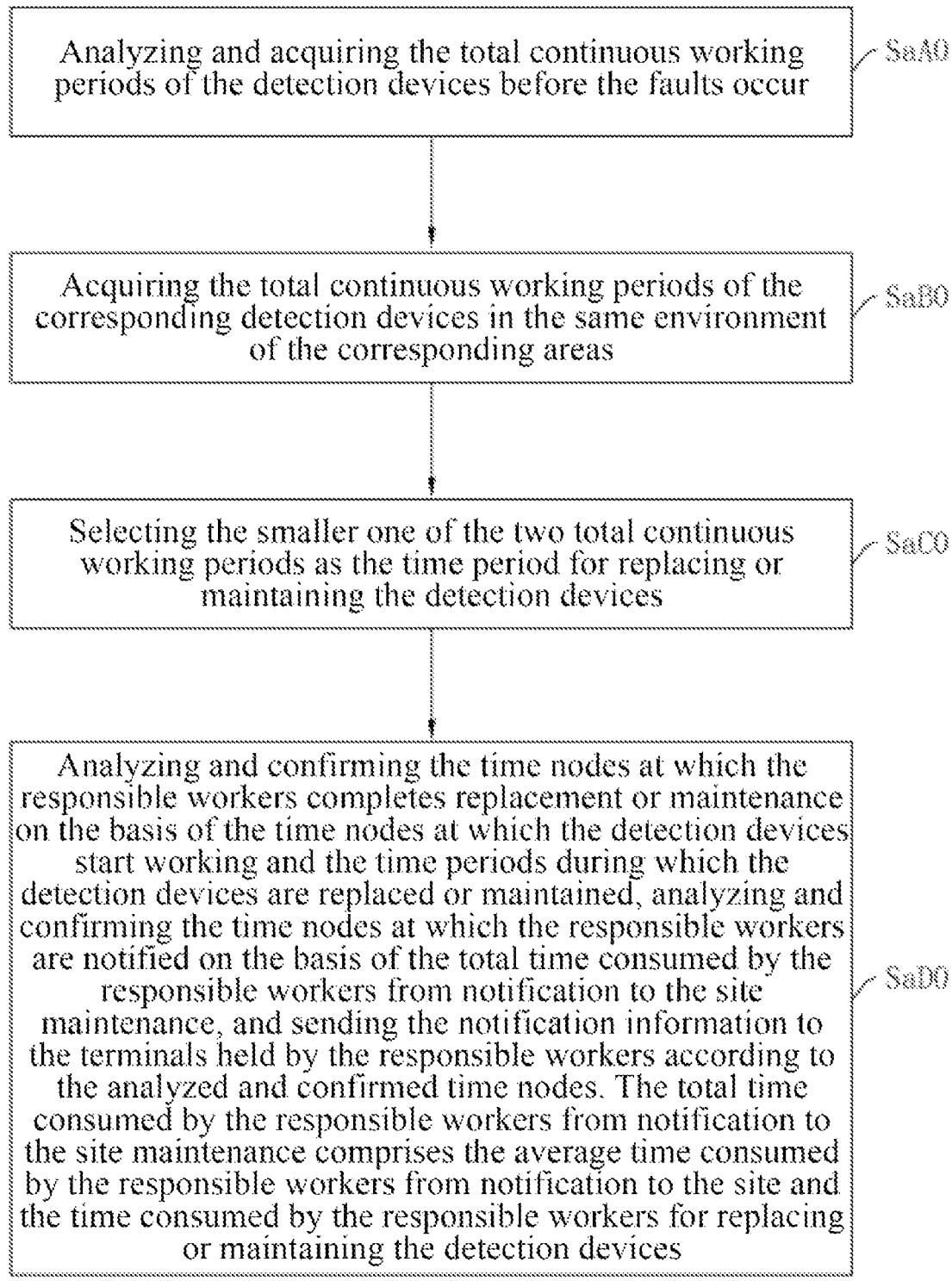
FIG. 9 is a schematic diagram of steps after tracing time nodes at which the fault problems of detection devices occur.

Referring to FIG. 9, further considering whether regular maintenance or replacement of the detection devices is needed or not since the detection devices are problematic at this time, the construction monitoring method for a V-shaped column in an underground foundation pit further comprises steps after tracing time nodes at which the fault problems of detection devices occur, specifically comprising step SaA0 to step SaD0.

In the step SaA0, analyzing and acquiring the total continuous working periods of the detection devices before the faults occur.

Wherein, the total continuous working periods of the detection devices before the faults occur can be analyzed, calculated and acquired according to the difference value between the current time node and the time nodes of the faults of the detection devices.

In the step SaB0, acquiring the total continuous working periods of the corresponding detection devices in the same environment of the corresponding areas.

Wherein, the total continuous working periods of the corresponding detection devices in the same environment of the corresponding areas can be acquired by inquiring from the databases in which the total average continuous working periods of the corresponding detection devices in the same environment of the corresponding areas are stored.

In the step SaC0, selecting the smaller one of the two total continuous working periods as the time period for replacing or maintaining the detection devices.

For example, one of the durations is 10 days and the other of the durations is 12 days, and then the duration of 10 days is selected as the time period for replacing or maintaining the respective detection device for the sake of conservation.

In the step SaD0, analyzing and confirming the time nodes at which the responsible workers completes replacement or maintenance on the basis of the time nodes at which the detection devices start working and the time periods during which the detection devices are replaced or maintained, analyzing and confirming the time nodes at which the responsible workers are notified on the basis of the total time consumed by the responsible workers from notification to the site maintenance, and sending the notification information to the terminals held by the responsible workers according to the analyzed and confirmed time nodes. The total time consumed by the responsible workers from notification to the site maintenance comprises the average time consumed by the responsible workers from notification to the site and the time consumed by the responsible workers for replacing or maintaining the detection devices.

Wherein, it needs to be noted that the average time consumed by the responsible workers from notification to the site can be inquired and acquired from the databases in which the historical average time consumed by the corresponding responsible workers from the notification to the site is stored, and the time consumed by the responsible workers for replacing or maintaining the detection devices can also be inquired and acquired from the databases in which the historical time consumed by the corresponding responsible workers for replacing or maintaining the detection devices is stored.

The implementation principle of the embodiment is as follows.

Firstly, whether the stress data is within a preset range or not can be analyzed in real time. Once the stress data is not within the preset range, the timeliness of uploading the corresponding stress data to the data management platform can be shortened, so that the attention of responsible workers can be better attracted.

In addition, in consideration of more timely notification of the responsible workers, the responsible workers can be notified in an information sending mode, and the most suitable responsible workers can be determined in combination with the processing success rate of the responsible workers before notification.

In addition, when the most appropriate responsible workers are notified, the strategy of information notification is determined by comprehensively combining the feedback condition of the responsible workers.

In addition, after the notified responsible workers complete corresponding problem processing, whether the influence condition of historical uploading to the data management platform before the problems or not is traced according to the problem processing condition, and timely correction is carried out.

The embodiment of the present disclosure provides a computer readable storage medium comprising a program capable of being loaded and executed by the processor to realize the method according to any one of methods as shown in FIG. 2 to FIG. 9.

The computer readable storage medium comprises a variety of media in which program codes can be stored, such as a USB flash disk, a mobile hard disk drive, a Read-Only Memory (ROM), a Random Access Memory (RAM), a magnetic disk, or an optical disk.

Based on the same inventive concept, the embodiment of the present disclosure provides a construction monitoring system for a V-shaped column in an underground foundation pit. The system comprises a memory and a processor, and a program capable of running on the processor to implement any one of methods shown in FIG. 2 to FIG. 9 is stored on the memory.

The embodiment of the present disclosure further discloses a terminal. The terminal comprises a memory, a processor and a program stored on the memory and capable of running on the processor, and the program can be loaded and executed by the processor to implement any one of methods as shown in FIG. 2 to FIG. 9.

The above embodiment is only a better embodiment of the present disclosure, and does not limit the protection range of the present disclosure, so that equivalent changes made according to the structure, shape and principle of the present disclosure should be covered in the protection range of the present disclosure.

What is claimed is:

1. A construction monitoring method for a V-shaped column in an underground foundation pit, comprising the following steps:
    acquiring different stress-related data at a plurality of preset positions of stand columns (3) in real time;
    analyzing and judging whether the change rate of the stress-related data exceeds a preset change rate range or not or whether the stress-related data exceeds a preset stress-related data range or not;
    if yes, shortening the time limit for acquiring the stress-related data according to a preset proportion to form a new timing time limit, and uploading the stress-related data to a data management platform according to the new timing time limit on time; and
    if no, uploading the acquired stress data to the data management platform according to original timing time limit on time;
    further comprising the step parallel to the step of uploading the stress data to the data management platform according to the new timing time limit on time, specifically comprising the following steps:
    acquiring specific reason information for forming the new timing time limit;
    analyzing and determining root problem information formed by current specific reasons and root problem probability distribution information based on the corresponding relation between the specific reason information and the root problem information formed by the corresponding specific reasons and root problem probability distribution information;
    analyzing and confirming responsible workers with the highest overall success rate data as notified responsible workers based on the root problem information formed by current specific reasons and root problem probability distribution information, and the success rate data about information processing of different root problems in the current state of the responsible workers, and defining at least two responsible workers; and
    sending notification information for notifying the analyzed and confirmed responsible workers to the construction site of the V-shaped column (2) for processing to terminals held by corresponding responsible workers.

2. The construction monitoring method for a V-shaped column in an underground foundation pit according to claim 1, wherein the step of analyzing and confirming responsible workers with the highest overall success rate data as notified responsible workers comprises the following steps:
    multiplying the probability of the root problem information formed by current specific reasons one by one by the success rate of the responsible workers about information processing of corresponding root problems so as to acquire probabilities that the responsible workers encounter different root problems and successfully process the root problems; and
    taking the sum of the probabilities that the responsible workers encounter different root problems and successfully process the root problems as the overall success rate that the responsible workers encounter the root problems and successfully process the root problems, and taking the responsible workers with the highest overall success rate data as the notified responsible workers.

3. The construction monitoring method for a V-shaped column in an underground foundation pit according to claim 2, wherein the step of taking the responsible workers with the highest overall success rate data as the notified responsible workers comprises the following steps:
    analyzing and judging the number of the responsible workers with the highest overall success rate data;
    if the number is one, taking the confirmed responsible workers as the notified responsible workers;
    if the number exceeds one, accumulating the probabilities corresponding to the root problems one by one from large to small until the sum of the probabilities exceeds 50%, screening out the root problems, and multiplying the probability of the root problem information by the success rate of the responsible workers with the highest overall success rate data about information processing of corresponding root problems one by one so as to acquire the probability that the corresponding responsible workers encounter the screened root problems and successfully process the root problems; and
    taking the sum of the probabilities that the responsible workers encounter the screened different root problems and successfully process the root problems as the overall success rate that the responsible workers encounter the screened root problems and successfully process the root problems, and taking the responsible workers with the highest overall success rate data as the notified responsible workers.

4. The construction monitoring method for a V-shaped column in an underground foundation pit according to claim 1, wherein the step of sending notification information for notifying the analyzed and confirmed responsible workers to the construction site of the V-shaped column (2) for processing to terminals held by corresponding responsible workers comprises the following steps:
    acquiring the contact information of the analyzed and confirmed responsible workers;
    sending the notification information to the terminals held by corresponding responsible workers;
    if the notification information is not confirmed to be received within the preset time, inquiring and acquiring the current working state information of the responsible workers, and comprehensively analyzing and determining average feedback duration data of the responsible workers after receiving the notification information under the current working state information in combination with the average feedback duration data of the responsible workers after receiving the notification information under different working state information;

sending the notification information to the terminals held by corresponding responsible workers again, and starting timing when the sending is successful;

if the responsible workers confirm receiving within the average feedback duration data after receiving the notification information, confirming that the corresponding responsible workers are successfully notified;

otherwise, screening out the responsible workers with the highest overall success rate data from the other responsible workers as the notified responsible workers, and sending the notification information to the corresponding responsible workers; and if the notification information is confirmed to be received within the preset time, confirming that the corresponding responsible workers are successfully notified.

5. The construction monitoring method for a V-shaped column in an underground foundation pit according to claim 1, wherein the step of sending notification information for notifying the analyzed and confirmed responsible workers to the construction site of the V-shaped column (2) for processing to terminals held by corresponding responsible workers comprises the following steps:

acquiring the analyzed and confirmed contact information of the responsible workers, the working states of the responsible workers in different working periods and the average feedback duration data of the responsible workers after receiving the notification information under different working state information;

acquiring the average feedback duration data of the responsible workers in the working state of the current time period;

acquiring the time consumed by the responsible workers from the current time node to the next working period, and taking the sum of the consumed time and the average feedback duration data of the responsible workers in the working state of the next working period as the real average feedback duration data notified by the responsible workers in the next working period;

comparing the average feedback duration data of the responsible workers in the working state of the current time period with the real average feedback duration data notified by the responsible workers in the next working period;

if the average feedback duration data of the responsible workers in the working state of the current time period is small, sending the notification information to the terminals held by the responsible workers at the current time; and if the real average feedback duration data notified by the responsible workers in the next working period is small, sending the notification information to the terminals held by the responsible workers at the time nodes at which the responsible workers start in the next working period.

6. The construction monitoring method for a V-shaped column in an underground foundation pit according to claim 4, further comprising the step of sending notification information for notifying the analyzed and confirmed responsible workers to the construction site of the V-shaped column (2) for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

7. The construction monitoring method for a V-shaped column in an underground foundation pit according to claim 5, further comprising the step of sending notification information for notifying the analyzed and confirmed responsible workers to the construction site of the V-shaped column (2) for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

8. A construction monitoring system for a V-shaped column in an underground foundation pit, comprising a memory, a processor and a program stored on the memory and capable of running on the processor, wherein the program can be loaded and executed by the processor to realize the construction monitoring method for a V-shaped column in an underground foundation pit according to claim 1.

9. The construction monitoring system according to claim 8, wherein the step of analyzing and confirming responsible workers with the highest overall success rate data as notified responsible workers comprises the following steps:

multiplying the probability of the root problem information formed by current specific reasons one by one by the success rate of the responsible workers about information processing of corresponding root problems so as to acquire probabilities that the responsible workers encounter different root problems and successfully process the root problems; and taking the sum of the probabilities that the responsible workers encounter different root problems and successfully process the root problems as the overall success rate that the responsible workers encounter the root problems and successfully process the root problems, and taking the responsible workers with the highest overall success rate data as the notified responsible workers.

10. The construction monitoring system according to claim 9, wherein the step of taking the responsible workers with the highest overall success rate data as the notified responsible workers comprises the following steps:

analyzing and judging the number of the responsible workers with the highest overall success rate data;

if the number is one, taking the confirmed responsible workers as the notified responsible workers;

if the number exceeds one, accumulating the probabilities corresponding to the root problems one by one from large to small until the sum of the probabilities exceeds 50%, screening out the root problems, and multiplying the probability of the root problem information by the success rate of the responsible workers with the highest overall success rate data about information processing of corresponding root problems one by one so as to acquire the probability that the corresponding responsible workers encounter the screened root problems and successfully process the root problems; and taking the sum of the probabilities that the responsible workers encounter the screened different root problems and successfully process the root problems as the overall success rate that the responsible workers encounter the screened root problems and successfully process the root problems, and taking the responsible workers with the highest overall success rate data as the notified responsible workers.

11. The construction monitoring system according to claim 8, wherein the step of sending notification information for notifying the analyzed and confirmed responsible workers to the construction site of the V-shaped column (2) for processing to terminals held by corresponding responsible workers comprises the following steps:

acquiring the contact information of the analyzed and confirmed responsible workers;

sending the notification information to the terminals held by corresponding responsible workers;

if the notification information is not confirmed to be received within the preset time, inquiring and acquiring the current working state information of the responsible workers, and comprehensively analyzing and determining average feedback duration data of the responsible workers after receiving the notification information under the current working state information in combination with the average feedback duration data of the responsible workers after receiving the notification information under different working state information;

sending the notification information to the terminals held by corresponding responsible workers again, and starting timing when the sending is successful;

if the responsible workers confirm receiving within the average feedback duration data after receiving the notification information, confirming that the corresponding responsible workers are successfully notified;

otherwise, screening out the responsible workers with the highest overall success rate data from the other responsible workers as the notified responsible workers, and sending the notification information to the corresponding responsible workers; and if the notification information is confirmed to be received within the preset time, confirming that the corresponding responsible workers are successfully notified.

12. The construction monitoring system according to claim 8, wherein the step of sending notification information for notifying the analyzed and confirmed responsible workers to the construction site of the V-shaped column (2) for processing to terminals held by corresponding responsible workers comprises the following steps:

acquiring the analyzed and confirmed contact information of the responsible workers, the working states of the responsible workers in different working periods and the average feedback duration data of the responsible workers after receiving the notification information under different working state information;

acquiring the average feedback duration data of the responsible workers in the working state of the current time period;

acquiring the time consumed by the responsible workers from the current time node to the next working period, and taking the sum of the consumed time and the average feedback duration data of the responsible workers in the working state of the next working period as the real average feedback duration data notified by the responsible workers in the next working period;

comparing the average feedback duration data of the responsible workers in the working state of the current time period with the real average feedback duration data notified by the responsible workers in the next working period;

if the average feedback duration data of the responsible workers in the working state of the current time period is small, sending the notification information to the terminals held by the responsible workers at the current time; and if the real average feedback duration data notified by the responsible workers in the next working period is small, sending the notification information to the terminals held by the responsible workers at the time nodes at which the responsible workers start in the next working period.

13. The construction monitoring system according to claim 11, further comprising the step of sending notification information for notifying the analyzed and confirmed responsible workers to the construction site of the V-shaped column (2) for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

14. The construction monitoring system according to claim 12, further comprising the step of sending notification information for notifying the analyzed and confirmed responsible workers to the construction site of the V-shaped column (2) for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

15. A computer storage medium, comprising a program capable of being loaded and executed by the processor to realize the construction monitoring method for a V-shaped column in an underground foundation pit according to claim 1.

16. The computer storage medium according to claim 15, wherein the step of analyzing and confirming responsible workers with the highest overall success rate data as notified responsible workers comprises the following steps:

multiplying the probability of the root problem information formed by current specific reasons one by one by the success rate of the responsible workers about information processing of corresponding root problems so as to acquire probabilities that the responsible workers encounter different root problems and successfully process the root problems; and taking the sum of the probabilities that the responsible workers encounter different root problems and successfully process the root problems as the overall success rate that the responsible workers encounter the root problems and successfully process the root problems, and taking the responsible workers with the highest overall success rate data as the notified responsible workers.

17. The computer storage medium according to claim 16, wherein the step of taking the responsible workers with the highest overall success rate data as the notified responsible workers comprises the following steps:

analyzing and judging the number of the responsible workers with the highest overall success rate data;

if the number is one, taking the confirmed responsible workers as the notified responsible workers;

if the number exceeds one, accumulating the probabilities corresponding to the root problems one by one from large to small until the sum of the probabilities exceeds 50%, screening out the root problems, and multiplying the probability of the root problem information by the success rate of the responsible workers with the highest overall success rate data about information processing of corresponding root problems one by one so as to acquire the probability that the corresponding responsible workers encounter the screened root problems and successfully process the root problems; and taking the sum of the probabilities that the responsible workers encounter the screened different root problems and successfully process the root problems as the overall success rate that the responsible workers encounter the screened root problems and successfully process the root problems, and taking the responsible workers with the highest overall success rate data as the notified responsible workers.

18. Computer storage medium according to claim 15, wherein the step of sending notification information for notifying the analyzed and confirmed responsible workers to the construction site of the V-shaped column (2) for processing to terminals held by corresponding responsible workers comprises the following steps:

acquiring the contact information of the analyzed and confirmed responsible workers;

sending the notification information to the terminals held by corresponding responsible workers;

if the notification information is not confirmed to be received within the preset time, inquiring and acquiring the current working state information of the responsible workers, and comprehensively analyzing and determining average feedback duration data of the responsible workers after receiving the notification information under the current working state information in combination with the average feedback duration data of the responsible workers after receiving the notification information under different working state information;

sending the notification information to the terminals held by corresponding responsible workers again, and starting timing when the sending is successful;

if the responsible workers confirm receiving within the average feedback duration data after receiving the notification information, confirming that the corresponding responsible workers are successfully notified;

otherwise, screening out the responsible workers with the highest overall success rate data from the other responsible workers as the notified responsible workers, and sending the notification information to the corresponding responsible workers; and if the notification information is confirmed to be received within the preset time, confirming that the corresponding responsible workers are successfully notified.

19. The computer storage medium according to claim 15, wherein the step of sending notification information for notifying the analyzed and confirmed responsible workers to the construction site of the V-shaped column (2) for processing to terminals held by corresponding responsible workers comprises the following steps:

acquiring the analyzed and confirmed contact information of the responsible workers, the working states of the responsible workers in different working periods and the average feedback duration data of the responsible workers after receiving the notification information under different working state information;

acquiring the average feedback duration data of the responsible workers in the working state of the current time period;

acquiring the time consumed by the responsible workers from the current time node to the next working period, and taking the sum of the consumed time and the average feedback duration data of the responsible workers in the working state of the next working period as the real average feedback duration data notified by the responsible workers in the next working period;

comparing the average feedback duration data of the responsible workers in the working state of the current time period with the real average feedback duration data notified by the responsible workers in the next working period;

if the average feedback duration data of the responsible workers in the working state of the current time period is small, sending the notification information to the terminals held by the responsible workers at the current time; and if the real average feedback duration data notified by the responsible workers in the next working period is small, sending the notification information to the terminals held by the responsible workers at the time nodes at which the responsible workers start in the next working period.

20. The computer storage medium according to claim 18, further comprising the step of sending notification information for notifying the analyzed and confirmed responsible workers to the construction site of the V-shaped column (2) for processing to terminals held by corresponding responsible workers, specifically comprising the following steps:

acquiring feedback information reflecting real root problems;

if the root problems reflected by the feedback information are fault problems of detection devices, tracing time nodes at which the fault problems of the detection devices occur, wherein the fault information of the detection devices comprises specific fault problems of the detection devices;

calculating and analyzing the number of time nodes which are spanned when the fault problems of the detection devices occur and are uploaded to the data management platform;

if the number is zero, not tracing data change caused by the fault problems of previous detection devices any more;

if the number is one or more than one, based on the specific fault problems of the current detection device, the difference data between data detected by the current detection devices and real data, and the data change track information of the detection devices and the corresponding detection devices after different specific fault problems occur, analyzing and calculating correct stress data which should be uploaded at each time node, and uploading the correct stress data to the data management platform to replace the stress data of the original time node; and if the root problems reflected by the feedback information are stress data problems, not modifying the stress data uploaded to the data management platform.

* * * * *